(12) United States Patent
Zhao

(10) Patent No.: US 8,078,872 B2
(45) Date of Patent: Dec. 13, 2011

(54) METHOD, SYSTEM AND DEVICE FOR DETERMINING A MOBILE IP KEY, NOTIFYING A MOBILE IP TYPE

(75) Inventor: Yuankui Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 484 days.

(21) Appl. No.: 12/351,228

(22) Filed: Jan. 9, 2009

(65) Prior Publication Data

US 2009/0132817 A1    May 21, 2009

Related U.S. Application Data

(63) Continuation of application No. PCT/CN2007/070268, filed on Jul. 11, 2007.

(30) Foreign Application Priority Data

Jul. 11, 2006    (CN) .......................... 2006 1 0100876

(51) Int. Cl.
*H04L 9/00*    (2006.01)
*H04K 1/00*    (2006.01)

(52) U.S. Cl. ....................................... 713/168; 380/272

(58) Field of Classification Search .................... 380/272
See application file for complete search history.

(56) References Cited

U.S. PATENT DOCUMENTS

| | | | | |
|---|---|---|---|---|
| 7,277,416 | B1 * | 10/2007 | Chang et al. ................... | 370/338 |
| 2001/0036164 | A1 * | 11/2001 | Kakemizu et al. ............ | 370/331 |
| 2002/0067831 | A1 * | 6/2002 | Zhu et al. ...................... | 380/272 |
| 2005/0025091 | A1 | 2/2005 | Patel et al. | |
| 2005/0190734 | A1 * | 9/2005 | Khalil et al. ................... | 370/338 |
| 2005/0237983 | A1 | 10/2005 | Khalil et al. | |
| 2006/0146752 | A1 * | 7/2006 | Jang et al. ...................... | 370/331 |
| 2007/0056023 | A1 * | 3/2007 | Leung ............................... | 726/4 |
| 2007/0081495 | A1 * | 4/2007 | Tsirtsis et al. ................. | 370/331 |

FOREIGN PATENT DOCUMENTS

| | | |
|---|---|---|
| CN | 1297662 A | 5/2001 |
| CN | 1471282 A | 1/2004 |
| CN | 1714560 A | 12/2005 |
| WO | 2005/104487 A1 | 11/2005 |

OTHER PUBLICATIONS

First Office Action in Chinese Application No. 200610100876.9, mailed May 20, 2010.
PCT Office Written Opinion in PCT Application No. PCT/CN2007/070268, mailed Oct. 25, 2007.
Perkins, "Mobile IP and Security Issue: An Overview," *Nokia*, 131-148 (Oct. 25, 1999).

* cited by examiner

*Primary Examiner* — Matthew Smithers
(74) *Attorney, Agent, or Firm* — Leydig, Voit & Mayer, Ltd.

(57) ABSTRACT

The present invention relates to a wireless communication technology field. A method for determining a mobile IP key of a mobile terminal is provided, which includes: receiving a mobile IP registration request message of a mobile terminal, in which the mobile IP registration request message includes a key material field; and reporting material information for determining a key according to the key material field. A method for determining a mobile IP key of a mobile terminal, a mobile IP agent device, a system for obtaining a mobile IP type, and a mobile terminal are also provided. With the technical solutions provided in the present invention, the mobile IP keys and/or the mobile IP type of the mobile terminal can be correctly determined, thus achieving a fast and correct access of the mobile terminal.

4 Claims, 5 Drawing Sheets

METHOD, SYSTEM AND DEVICE FOR DETERMINING A MOBILE IP KEY, NOTIFYING A MOBILE IP TYPE

CROSS-REFERENCE TO RELATED APPLICATIONS

This application is a continuation of International Patent Application No. PCT/CN2007/070268, filed Jul. 11, 2007, which claims priority to Chinese Patent Application No. 200610100876.9, filed Jul. 11, 2006, both of which are hereby incorporated by reference in their entirety.

FIELD OF THE TECHNOLOGY

The present invention relates to a wireless communication field, and particularly to a method for determining a mobile IP key of a mobile terminal, a method and system for notifying a mobile IP type of a mobile terminal, a mobile IP agent device, and a mobile terminal.

BACKGROUND

When a mobile terminal intends to access a wireless network that supports an extensible authentication protocol (EAP) authentication manner, for example in a worldwide interoperability for microwave access (Wimax) network, an EAP authentication process needs to be performed first. After the authentication is passed, a master session key (MSK) and an extended MSK (EMSK) are respectively generated on the mobile terminal side and an authorization, authentication, and accounting (AAA) server side.

Further, a mobile IP-root key (MIP-RK) is calculated according to the EMSK respectively on the mobile terminal side and the AAA server side. Various mobile-related keys are derived through calculation by combining the root key with addresses of a home agent (HA), a foreign agent (FA) and so on, including a mobile IP key between the mobile terminal and the AAA server (MN-AAA), a mobile IP key between the mobile terminal and the HA (MN-HA), mobile IP key between the mobile terminal and the FA (MN-FA), and a mobile IP key between the FA and the HA (FA-HA). By using these keys, the security of mobile IP registration is achieved.

After the initial authentication is finished, the mobile terminal initiates a mobile IP registration process, in other words, the mobile terminal sends a mobile IP registration request message protected by using the MN-HA. Since the HA does not have the MN-HA after receiving the mobile IP registration request message for the mobile terminal from the FA, the message cannot be authenticated. Thus, the HA requests the MN-HA from the AAA server so as to authenticate the mobile IP registration request message.

At present, mobile IP type of the mobile terminal can be categorized into proxy mobile IP (PMIP) and client mobile IP (CMIP) based on the location of a management entity from a perspective of the mobile terminal. When the mobile terminal performs an initial access registration and initiates a mobile IP registration request, or the mobile terminal initiates a mobile IP registration request due to the key update of the mobile terminal, the keys used during the registration process may vary according to different mobile IP types. For the generation of the MN-HA in IPv4, a PMIP mobile terminal and a CMIP mobile terminal are respectively considered, and calculation formulas are as follows:

$$MN\text{-}HA\text{-}CMIP4 = H(MIP\text{-}RK, \text{"CMIP4 MN HA"} | HA\text{-}IP) \quad (1)$$

$$MN\text{-}HA\text{-}PMIP4 = H(MIP\text{-}RK, \text{"PMIP4 MN HA"} | HA\text{-}IP) \quad (2)$$

"MIP-RK" in the above formulas refers to a mobile IP-root key, "CMIP4 MN HA" or "PMIP4 MN HA" refers to a type of the mobile terminal, and "HA-IP" refers to an IP address of the HA.

For example, regarding the PMIP mobile terminal, it may obtain a real and meaningful HA address allocated to the mobile terminal by the AAA server during the initial authentication process. Therefore, when the PMIP mobile terminal initiates a mobile IP registration request message, content of an HA address field in the mobile IP registration request can be an IP address of a real HA, the HA address value is used to generate the MN-HA (namely formula 2), and the mobile IP registration request message is protected by using the generated MN-HA. Regarding the CMIP mobile terminal, it may not obtain the real and meaningful HA address during the initial authentication process, in this case, the content of the HA address field in the mobile IP registration request is defaulted all 0 (HA address: 0.0.0.0) or all 1 (HA address: 255.255.255.255). Thus, the MN-HA (namely formula 1) is generated by using default values of all 0 or all 1, and the mobile IP registration request message is protected by using the generated MN-HA.

Further, the HA requests the MN-HA of the mobile terminal from the AAA server after receiving the mobile IP registration request from the mobile terminal (either the PMIP mobile terminal or the CMIP mobile terminal). It can be seen that, in the prior art, a mobile IP key of the mobile terminal that initiates the mobile IP registration request cannot be determined correctly, neither the mobile IP type of the mobile terminal that initiates the mobile IP registration request can be obtained correctly.

SUMMARY

Accordingly, embodiments of the present invention provide a method for determining a mobile IP key for a mobile terminal and a mobile IP agent device.

Embodiments of the present invention also provide a method, a mobile IP agent device, a system and a mobile terminal for notifying a mobile IP type.

Embodiments of the present invention provide a method for determining a mobile IP key for a mobile terminal: a mobile IP registration request message of a mobile terminal is received, in which the mobile IP registration request message includes a key material field; and material information for determining a key is reported according to the key material field.

Embodiments of the present invention further provide a mobile IP agent device, which includes a first receiving unit adapted to receive a mobile IP registration request message of a mobile terminal, in which the mobile IP registration request message includes a key material field, and a key material reporting unit adapted to report material information for determining a key to a key processing entity according to the key material field.

Embodiments of the present invention further provide a method for notifying a mobile terminal of a mobile IP type; a mobile IP registration request message of the mobile terminal is received, in which the mobile IP registration request message includes an identification field of a mobile IP type; and mobile IP type information is reported to a mobile IP type demander according to the identification field of the mobile IP type identification field.

Embodiments of the present invention further provide a mobile IP agent device, which includes a second receiving unit adapted to receive a mobile IP registration request message of a mobile terminal, in which the mobile IP registration request message includes an identification field of a mobile IP type, and a type information reporting unit adapted to report mobile IP type information to a mobile IP type demander according to the identification field of the mobile IP type.

Embodiments of the present invention further provide a system for obtaining a mobile IP type of a mobile terminal, which includes a mobile IP agent and a mobile IP type demander. The mobile IP agent is adapted to receive a mobile IP registration request message from the mobile terminal, and report mobile IP type information of the mobile terminal to the mobile IP type demander according to an identifier of a mobile IP type in the mobile IP registration request message. The mobile IP type demander is adapted to determine the mobile IP type of the mobile terminal according to the mobile IP type information reported by the mobile IP agent.

Embodiments of the present invention further provide a mobile terminal. When the mobile terminal performs an initial access registration or the mobile terminal performs a key update, the mobile terminal sends a mobile IP registration request message to a mobile IP agent for a mobile IP registration, and the mobile IP registration request message includes an identifier of a mobile IP type identification field adapted to identify the mobile IP type of the mobile terminal.

DETAILED DESCRIPTION

Figure 1:
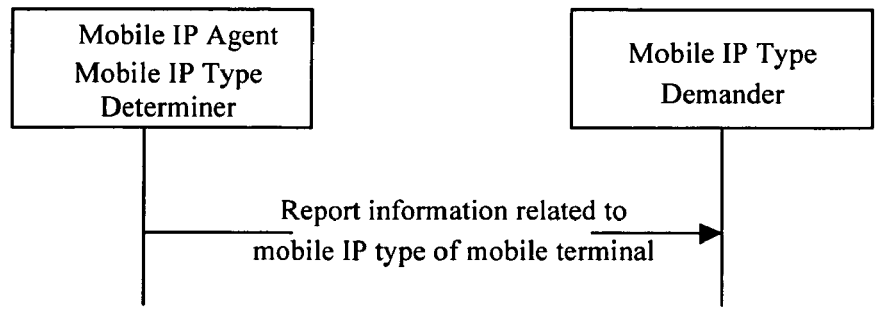
FIG. 1 is a schematic view of a method for notifying a mobile IP type of a mobile terminal according to an embodiment of the present invention.

During implementing the present invention, the inventor found that different values of HA address may be used to generate the MN-HA after the AAA server receives the request of the HA, so the MN-HA corresponding to the mobile terminal cannot be determined. Accordingly, a possible MN-HA distribution method may be that: the AAA server sends all of the MN-HAs generated according to the different values of HA address to the HA, and the HA judges whether the mobile IP registration request of the mobile terminal is legal or not according to whether a matched key exists or not. However, contents to be transferred are undoubtedly increased by using the method, and the blindfold judgment for the HA may lead to safety troubles.

In an embodiment of the present invention, for example, content of an HA address field in a first mobile IP registration request initiated by a CMIP mobile terminal may be all 0 (0.0.0.0) or all 1 (255.255.255.255), and the content of the HA address field in the first mobile IP registration request initiated by a PMIP mobile terminal may be a meaningful and real IP address.

When the mobile IP agent (including an HA or an FA) receives a mobile IP registration request that is never recorded before, the mobile IP agent may determine that the mobile IP registration request is sent by the CMIP type mobile terminal if an HA address field in the mobile IP registration request is all 0 or all 1, and the mobile IP agent may determine that the mobile IP registration request is sent by the PMIP type mobile terminal if the HA address field in the mobile IP registration request is a value other than all 0 or all 1.

Further, the mobile IP agent may directly report content or an identifier of content of the HA address field in the mobile IP registration request to an AAA server, so that the AAA server determines a mobile IP key of the mobile terminal accordingly. In addition, the mobile IP agent may also report a mobile IP type or an identifier of the mobile IP type to the AAA server according to the content of the HA address field in the mobile IP registration request, and further the AAA server may determine related mobile IP keys of the mobile terminal according to the mobile IP type or the identifier of the mobile IP type. After that, the AAA server can send the related mobile IP keys back to the HA.

In the above technical solution of directly reporting the content or the identifier of the content of the HA address field in the mobile IP registration request, the HA and the AAA server may judge the mobile IP type of the mobile terminal not according to the content the HA address or the identifier thereof, and the related mobile IP keys of the mobile terminal is directly determined by the AAA server according to the content of the HA address and send all the related mobile IP keys back to the HA. Definitely, on this basis, the HA or the AAA server may also judge the mobile IP type of the mobile terminal according to the content of the HA address or the identifier thereof, or judge the mobile IP type of the mobile terminal according to other contents. In addition, objects to which the HA reports the above information may include other entities besides the AAA server.

A schematic view of a method for notifying a mobile IP type of a mobile terminal according to an embodiment of the present invention is introduced as following by FIG. 1.

Specifically, a mobile IP agent may judge a mobile IP type of a mobile terminal after obtaining an HA address field in a mobile IP registration request, and report the mobile IP type to other function entities (such as an AAA server) in an access network; or, the mobile IP agent directly reports a value of an obtained HA address field (namely content of the HA address field) or an identifier thereof to other function entities (such as the AAA server) of the access network; or, the mobile IP agent reports the mobile IP type information to a mobile mode storage unit in an access network after judging the mobile IP type of the mobile terminal. The other function entities and the mobile mode storage unit of the access network are uniformly referred to as mobile IP type demanders.

The above reported mobile IP type information may be explicit indication information, namely a message explicitly indicating the mobile IP type of the mobile terminal is reported, for example, through an identifier bit of 1 bit. For example, 1 represents a mobile terminal of the PMIP type, and 0 represents a mobile terminal of the CMIP type, and vice versa. If we can agree on the assumption that CMIP mobile terminal always initials the mobile IP registration message with the HA address field of all 0 and all 1 and PMIP mobile terminal always initials the mobile IP registration message with the HA address field of values other than all 0 or all 1, then the reported mobile IP type information may also be implicit indication information, namely a value of the HA address field or an identifier of the value is hidden in relevant context information to report: the information represents the mobile terminal of the CMIP type if being all 0 or all 1, and the information represents the mobile terminal of the PMIP type if being the meaningful and real IP address. Further, the AAA server may determine a mobile IP key of the mobile terminal after receiving the explicit indication information or the implicit indication information, for example, an MN-HA, according to the mobile IP type information of the mobile terminal. Otherwise, the HA address field may not be treated as a hint for the mobile IP type, but to calculate those mobile IP keys, and the HA address field still can be the key material for determining keys between the mobile terminal and the HA. If it is all 0 or all 1, the key calculated to protect the mobile IP registration response message may be generated by the real HA address assigned to the mobile terminal as defined in mobile IP protocol if the key is all 0 or all 1.

Figure 2:
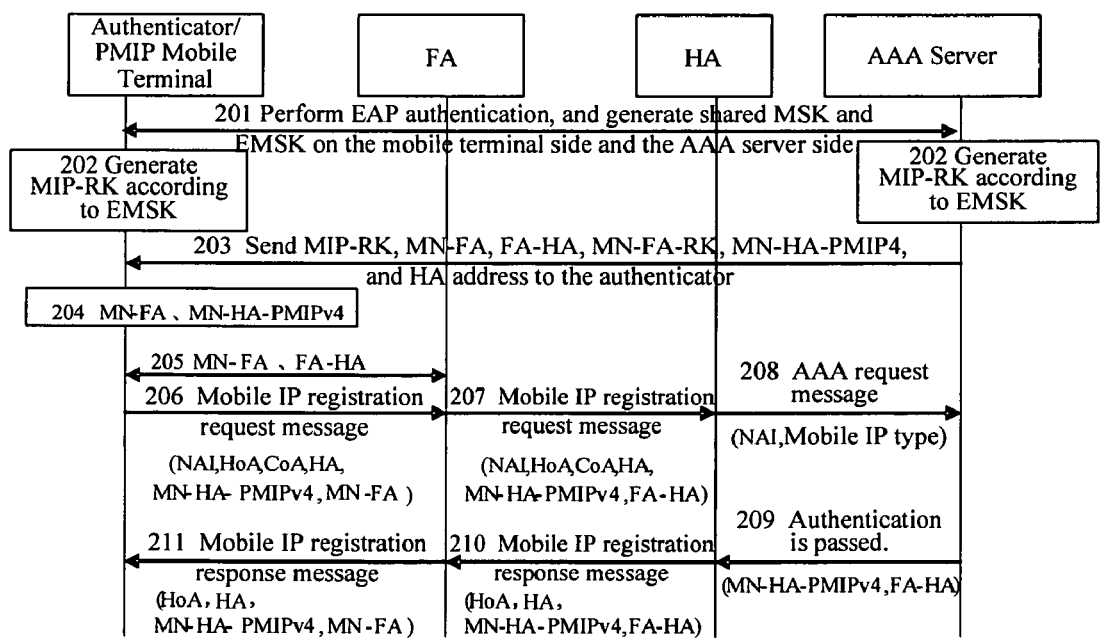
FIG. 2 is a flow chart of an initial access mobile IP registration process of a PMIP mobile terminal applying an embodiment of the present invention.

The present invention is further described in combination with specific embodiments. Refer to FIG. 2, which is a flow chart of an initial access mobile IP registration process of a PMIP mobile terminal applying the present invention.

Regarding the PMIP mobile terminal, the mobile terminal of the type cannot obtain an MN-AAA according to the prior art, but may obtain an MN-HA-PMIPv4 generated according to the HA address corresponding to the mobile IP type. Therefore, during the initial mobile IP registration request, the PMIP mobile terminal uses the MN-HA-PMIPv4 to protect an initial mobile IP registration request message, as shown in FIG. 2, and the detailed flow is as follows.

In Steps 201-202, a mobile terminal performs an EAP access authentication via an AAA server and an authenticator; an MSK and an EMSK are respectively generated on the mobile terminal side and on the AAA server side after the authentication is passed; and an MIP-RK is respectively generated on the mobile terminal side and on the AAA server side by the EMSK.

In Step 203, the AAA server sends the MIP-RK, the generated MN-HA-PMIPv4, and/or an MN-FA-RK, and/or an MN-FA, and/or an FA-HA, the HA address and other parameter information to the authenticator.

In Step 204, the authenticator obtains the MN-HA-PMIPv4 and generates or directly obtains the MN-FA and the FA-HA according to the received parameters.

In Step 205, when a network access identifier (NAI) of the mobile terminal is allocated, a corresponding record is stored in the AAA server and the authenticator, an FA obtains the NAI, the MN-FA, and the FA-HA of the mobile terminal through an interaction with the authenticator. The interaction of the FA and the authenticator may also be performed after the FA receives a mobile IP registration request message sent by the mobile terminal.

In Step 206, the mobile terminal initiates a mobile IP registration request, the mobile terminal sends the mobile IP registration request message to the FA and protects the message by using the MN-HA-PMIPv4 and the MN-FA, and the mobile IP registration request message includes the NAI, a home address (HoA), a care-of-address (CoA), the HA address and other fields. 0.0.0.0 is filled if the mobile terminal fails to obtain the HoA; and the HA address is the IP address allocated by the AAA server.

In Step 207, the FA validates an MN-FA authentication extension (AE) after receiving the mobile IP registration request message, removes the MN-FA AE and adds an FA-HA AE after the validation is passed, and sends the modified mobile IP registration request message to the HA.

In Step 208, the HA cannot authenticate the mobile IP registration request message after receiving the mobile IP registration request message, since the mobile IP registration request is for the initial registration of the mobile terminal and relevant information (for example, the MN-HA) does not exist in the HA. However, the HA may judge that the mobile terminal is the PMIP mobile terminal based on that the HA address in the mobile IP registration request message is the meaningful and real IP address and send the NAI and the MN-AAA of the mobile terminal, the parameter representing the type of the mobile terminal and other information to the AAA server through an AAA request message; and the AAA request message includes, but not limited to, a Radius message or a Diameter message.

In Step 209, the AAA server performs the validation according to the NAI of the mobile terminal after receiving the AAA request message. If the validation is passed, the AAA server judges and allocates a corresponding mobile IP relevant key to the mobile terminal, namely determines the mobile IP relevant key of the mobile terminal, according to the sent mobile IP type of the mobile terminal. In this embodiment, since the mobile IP registration request is initiated by the PMIP mobile terminal, the AAA server may send the MN-HA-PMIPv4 generated and allocated to the mobile terminal to the HA, and the FA-HA is sent simultaneously. Here the MN-HA-CMIPv4 can be either generated by the all 0 or all 1 or by values other than the all 0 or all 1; in addition, both of them can be sent simultaneously as well to the HA to see the agreement between the HA and the AAA server.

In Steps 210-211, the HA authenticates the mobile IP registration request by using the MN-HA-PMIPv4 of the mobile terminal sent by the AAA server, sends the HoA and the HA address allocated to the mobile terminal to the mobile terminal via the FA through a mobile IP registration response message after the authentication is passed, and protects a returned message by using the MN-HA-PMIPv4.

For this process of authentication, if the PMIP mobile terminal sends also the HA address field of the all 0 or all 1, and also use them to compute the related MN-HA value, then the HA can use firstly the MN-HA generated by the all 0 or all 1 to authenticate the mobile IP registration request, request, and then use the MN-HA generated by the HA address field of values other than the all 1 or all 0 to protect the mobile IP registration response message accordingly.

Regarding the CMIP mobile terminal, it may protect the initial mobile IP registration request by using the MN-AAA, and may also protect the initial mobile IP registration request by using the MN-HA. If the initial mobile IP registration request is protected by using the MN-AAA, the HA is required to judge that an authentication request needs to be initiated to the AAA server according to the received MN-AAA, further, the AAA server is required to authenticate the mobile terminal and obtain the MN-HA-CMIPv4 and the FA-HA keys. Since the PMIP mobile terminal can only protect the initial and all subsequent mobile IP registration messages by using the MN-HA, the HA is preferably not required to have multiple parallel judging standards. Therefore, in embodiments of the present invention, the HA is only required to perform the validation according to the MN-HA.

An embodiment of the present invention in the situation that the CMIP mobile terminal uses the MN-HA to protect the initial mobile IP registration request are described hereinafter. The HA may judge whether it is the initial validation or not by judging whether the record of the mobile terminal is stored or not and whether a key update identifier is included in the MN-HA or not.

Figure 3:
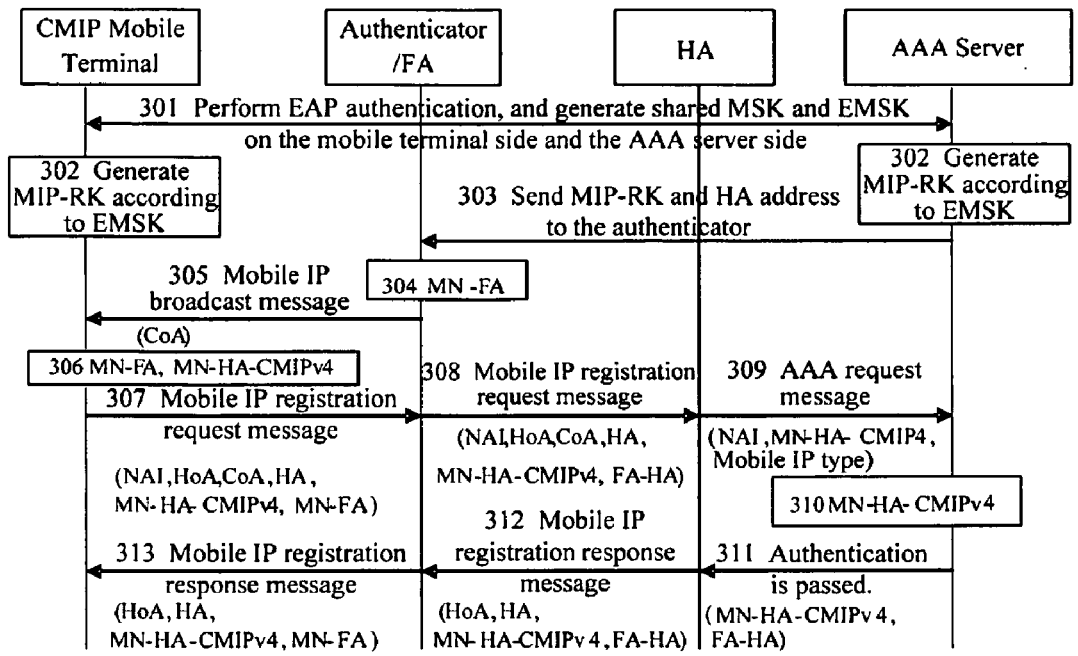
FIG. 3 is a flow chart of an initial access mobile IP registration process of a CMIP mobile terminal applying an embodiment of the present invention.

FIG. 3 is a flow chart of an initial access mobile IP registration process of a CMIP mobile terminal applying the present invention. The CMIP mobile terminal in this embodiment uses the MN-HA to protect the mobile IP registration request.

In Steps (301-302), a mobile terminal performs an EAP access authentication via an AAA server and an authenticator: an MSK and an EMSK are generated both on the mobile terminal side and on the AAA server side after the authentication is passed; and an MIP-RK is respectively generated on the mobile terminal side and on the AAA server side by the EMSK.

In Step 303, the AAA server sends parameters such as the MIP-RK, an HA address and other parameters to the authenticator.

In Step 304, the authenticator generates or directly obtains an MN-FA according to the received parameters.

In Step 305, the authenticator sends a CoA to the mobile terminal through a mobile IP broadcast message.

In Step 306, the mobile terminal calculates the MN-FA through the MIP-RK and the received CoA. At this time, since the mobile terminal has not obtained the HA address yet, content of the HA address field in the initial mobile IP registration request message is by default all 0 (0.0.0.0) or all 1 (255.255.255.255), and an MN-HA-CMIPv4 is calculated by using the value.

In Step 307, the mobile terminal initiates a mobile IP registration request, the mobile terminal sends the mobile IP registration request message to the FA, and protects the message by using the MN-HA-PMIPv4 and the MN-FA, and the mobile IP registration request message includes information such as an NAI, an HoA address, a CoA address, the HA address and content of other fields. 0.0.0.0 is filled because the mobile terminal fails to obtain the HoA. The content of the HA address field is all 0 (0.0.0.0) or all 1 (255.255.255.255).

In Step 308, the FA validates an MN-FA AE after receiving the mobile IP registration request message, removes the MN-FA AE and adds an FA-HA AE after the validation is passed, and sends the modified mobile IP registration request message to the HA.

In Step 309, the HA cannot authenticate the mobile IP registration request message after receiving the mobile IP registration request message, since the mobile IP registration request is for the initial registration of the mobile terminal and relevant information (for example, the MN-HA) does not exist in the HA. However, the HA may judge that the mobile terminal is the CMIP mobile terminal based on that content of the HA address field in the mobile IP registration request message is all 0 (0.0.0.0) or all 1 (255.255.255.255), and send the NAI and the MN-HA-CMIPv4 of the mobile terminal, the parameter representing the type of the mobile terminal and other information to the AAA server through an AAA request message; and the AAA request message includes, but not limited to, a Radius message or a Diameter message.

The parameter representing the types of the mobile terminal (namely the mobile IP type information of the mobile terminal) described above may be implemented in two manners.

For the first manner, a value of all 0 (0.0.0.0) or all 1 (255.255.255.255) of the HA address field in the mobile IP registration request message is reported to the AAA server as the IP address of the HA. Definitely, an identifier may also be adopted to represent the content of the HA address field, further, the identifier of the content of the HA address is reported to the AAA server. Further, on one hand, the AAA server may determine that the mobile terminal is the mobile terminal of the CMIP type according to the content the HA address field or the identifier thereof, on the other hand, the AAA server may determine the MN-HA-CMIPv4 key of the mobile terminal according to the content of the HA address field (for example, all 0 or all 1 value) or the identifier thereof.

It may be understood by those skilled in the art that, if the AAA server does not need to know the mobile IP type of the mobile terminal or the AAA server may determine the mobile IP type of the mobile terminal through other ways, the AAA server does not need to determine the mobile IP type of the mobile terminal according to the content of the HA address field or the identifier thereof, and merely determines the mobile IP key of the mobile terminal according to the content of the HA address field or the identifier thereof. In this solution, the HA directly reports the content of the HA address field or the identifier thereof in the received mobile IP registration request message to the AAA server, so if the HA does not need to know the mobile IP type of the mobile terminal or may know the type of the mobile terminal according to other ways, the HA may also not judge the mobile IP type of the mobile terminal according to the content of the HA address field.

For the second manner, an identifier is used to indicate that the mobile terminal is the mobile terminal of the CMIP type (namely an identifier of the mobile IP type), and another identifier is used to indicate whether the content of the HA address field of the mobile terminal is all 0 or all 1, for example, 0 represents all 0, and 1 represents all 1. In other words, in this case, the HA reports both the identifier of the mobile IP type and the identifier of the content of the HA address. For example, when the mobile terminal type is reported, the value of the all 0 (0.0.0.0) or all 1(255.255.255.255) of the HA address field is reported as the IP address of the HA.

Step 310, the AAA server performs a validation according to the NAI of the mobile terminal after receiving the AAA request message. If the validation is passed, the AAA server allocates a corresponding mobile IP relevant key to the mobile terminal, namely determines the mobile IP relevant key of the mobile terminal, according to the sent information of the mobile terminal (the identifier of the mobile IP type and/or the content of the HA address). In this embodiment, since the mobile IP registration request is initiated by the CMIP mobile terminal, if the mobile IP key of the mobile terminal generated by the AAA server is the MN-HA-PMIPv4 rather than the MN-HA-CMIPv4, the previously generated MN-HA-PMIPv4 needs to be deleted after it can decide the mobile IP type of the mobile terminal when the content of the HA address field and/or the identifier of the mobile IP type of the mobile terminal in the mobile IP registration request message is obtained, and the MN-HA-CMIPv4 of the mobile terminal is generated. Definitely, it is also possible that, the AAA server has generated the MN-HA-CMIPv4 and the MN-HA-PMIPv4 of the mobile terminal before receiving the AAA request message sent by the HA.

The AAA server may determine that the MN-HA of the mobile terminal is the MN-HA-CMIPv4 after obtaining the content of the HA address field or the identifier of the mobile IP type of the mobile terminal in the mobile IP registration request message.

Step 311, the AAA server sends the generated MN-HA-CMIPv4 and the FA-HA to the HA. Here the MN-HA-CMIPv4 can be either the one generated by the all 0 or all 1 or by the values other than the all 1 or all 0; in addition, both of them can be sent simultaneously as well to the HA to see the agreement between the HA and the AAA server.

Steps 312-313, the HA authenticates the mobile IP registration request by using the MN-HA-CMIPv4 sent by the AAA server, sends the HoA and the HA address that are allocated to the mobile terminal to the mobile terminal via the FA through a mobile IP registration response message after the authentication is passed, and uses the MN-HA-CMIPv4 to protect a returned message. To this process of authentication, the HA server may use firstly the MN-HA generated by all 0 or all 1 to authenticate the mobile IP registration request message, and then use the MN-HA generated by the HA address field of values other than the all 0 or all 1 to calculate the real MN-HA to protect the mobile registration response message accordingly.

From the above process which the PMIP mobile terminal or the CMIP mobile terminal sends the mobile IP registration request for the mobile IP registration during the initial access process, It can be seen that through the method of the embodiments of the present invention, the AAA server may obtain the content of the HA address field or the identifier of the content of the HA address field in the mobile IP registration request, or obtain the mobile IP type or the identifier of the mobile IP type of the mobile terminal, so as to determine and send the mobile IP key of the mobile terminal, thereby protecting the messages to be sent and received. It should be noted that, two manners for the HA to report the information to the AAA server introduced in the embodiment of the CMIP mobile terminal, for example, directly reporting the content of the HA address field or the identifier of the content of the HA address field in the mobile IP request message, or determining the mobile IP type according to the content of the HA address field and reporting the mobile IP type or the identifier thereof, are both applicable to the PMIP mobile terminal or mobile terminals of other types.

Particularly, the technical solution for the HA to directly report the content of the HA address field or the identifier thereof in the mobile IP request message to the AAA server is applicable to various mobile terminals. Although different mobile terminals may use different HA address values to calculated the related mobile IP keys and protect the mobile IP registration request message by using the generated mobile IP key, the content of the HA address field in the mobile IP request message is the same as the HA address adopted by the mobile IP key for protecting the mobile IP request message. Therefore, the AAA server can determine the mobile IP key of the mobile terminal after obtaining the content of the HA address field in the mobile IP request message reported by the HA. Definitely, the HA knows the mobile IP key of the mobile terminal after the AAA server sends the determined mobile IP key of the mobile terminal to the HA. It can be seen that, in this technical solution, in the case that the mobile IP key of the mobile terminal is generated by using an uncertain HA address, the AAA server and the HA can obtain the correct mobile IP key of the mobile terminal.

In addition, it can be seen from the above embodiments that, whether the HA reports the content of the HA address or the identifier of the content of the HA address, or report the mobile IP type or the mobile IP type identifier to the AAA server, the object to be reported to (for example, the AAA server) may invariably determine the mobile IP type of the mobile terminal, or accordingly determine the mobile IP key of the mobile terminal. However, the determination of the mobile IP type and the determination of the mobile IP key according to the same information reported by the HA are not necessarily related to each other. In other words, the object to be reported to may only determine the mobile IP key of the mobile terminal according to the information reported by the HA, but not determine the mobile IP type according to the information reported by the HA. In this case, the information reported by the HA may be considered as material information for determining a key, and a corresponding field in the mobile IP request message may be considered as a key material field.

Figure 4:
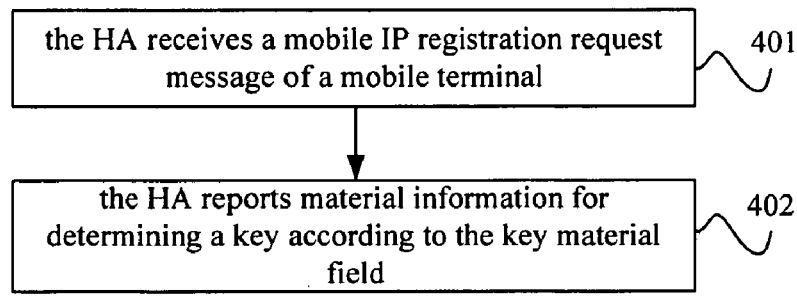
FIG. 4 is a flow chart of a method for determining a mobile IP key for a mobile terminal according to an embodiment of the present invention.

As shown in FIG. 4, which is a flow chart of a method for determining a mobile IP key for a mobile terminal according to an embodiment of the present invention, the method includes following steps.

In step 401, the HA receives a mobile IP registration request message of a mobile terminal, in which the mobile IP registration request message includes a key material field;

In step 402, the HA reports material information for determining a key according to the key material field.

It can be seen from the above technical solution that, in the embodiment of the present invention, the material information for determining a key is reported according to the key material field in the mobile IP registration request of the mobile terminal, so that the object to be reported to can determine correctly the mobile IP keys of the mobile terminal, after that, the correct mobile IP keys can be got by others as well.

Or the object to be reported to may only judge the mobile IP type of the mobile terminal according to the information reported by the HA, but not determine the mobile IP key according to the information reported by the HA. In this case, the information reported by the HA may be considered as mobile IP type information, and the corresponding field in the mobile IP request message may be considered as an identification field of the mobile IP type. Definitely, the object to which the HA reports the material information for determining a key or the mobile IP type information may also accordingly determine the mobile IP key and the mobile IP type at the same time.

Further, whether the HA reports the material information for determining a key or the mobile IP type information, the reporting object includes, but not limited to, the AAA server, and may also be other demanders, such as a mobile mode storage unit in an access network, for example, a context server, an FA, an authenticator, or other functional entities.

When the mobile terminal needs to perform a mobile IP registration request again due to a root key update of the mobile terminal, the mobile terminal uses the original MN-HA to protect the mobile IP registration request message, and a message sent or returned by the HA is to be protected by using the new MN-HA. Therefore, the case in the prior art that the HA falsely judges that this mobile IP registration request is wrong because the original MN-HA exists in the HA after the MN-HA is updated and there is no other identifier for notifying the HA that the MN-HA is changed as the key is updated is avoided.

In addition, embodiments of the present invention also allow the FA to determine and report the mobile IP type of the mobile terminal, and the detailed description is given as follows.

When the PMIP mobile terminal initiates the mobile IP registration request, the HA address field in the mobile IP registration request message received by the FA is a meaningful and real IP address and is the IP address of the HA of the mobile terminal, the FA may accordingly judge that the mobile IP type of the mobile terminal is PMIP, and further selects not to report the type to the access network, or to report that the mobile terminal has the mobile IP type of the PMIP type to a mobile mode storage unit in an access network, for example, a context server, an FA, an authenticator, or other function entities.

When the CMIP mobile terminal initiates the mobile IP registration request, the HA address field in the mobile IP registration request message received by the FA is the value of all 0 or all 1 e. Accordingly, the FA may determine that the mobile IP type of the mobile terminal is CMIP, and reports that the mobile terminal has the mobile IP type of the CMIP type to a mobile mode storage unit in an access network, for example, a context server, an FA, an authenticator, or other function entities.

Whether the MN-AAA is used to protect the initial mobile IP registration request does not conflict with the judging and reporting the mobile IP type as described in the above embodiments of the present invention. The judging may be performed according to the content of the HA address field or according to the protection by using MN-HA or MN-AAA. If it is limited that the MN-AAA is used to protect the initial mobile IP registration request of the CMIP mobile terminal, the judging may be performed according to whether the MN-AAA is used as the identifier of the mobile IP type in the initial mobile IP registration request.

Whether the keys used to protect the mobile IP registration request message and the mobile IP registration response message are the same or not is nomakes no difference matter to in this embodiment of the present invention, which will be all based on this invention.

In the present invention, the mobile IP registration request message may also be extended properly so as to use a dedicated identifier bit to represent the mobile IP type, and the detailed solution is described as follows.

Figure 5:
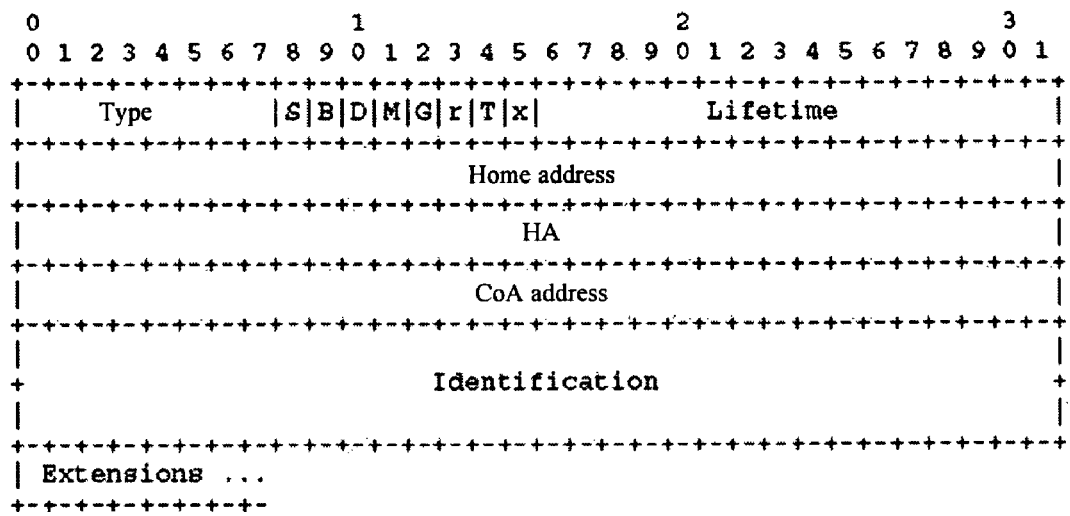
FIG. 5 is a schematic view of an extended mobile IP registration request message for identifying a mobile IP type according a first embodiment of the present invention.

1. As shown in FIG. 5, a reserved bit is adopted. The reserved bit in the mobile IP registration request message is defined as an identifier bit of the mobile IP type. The r bit is the reserved bit, and is defined as the identifier bit of the mobile IP type.

Figure 6:
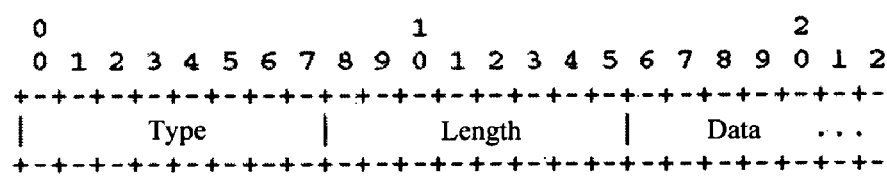
FIG. 6 is a schematic view of an extended mobile IP registration request message for identifying a mobile IP type according a second embodiment of the present invention.

2. As shown in FIG. 6, a prior mobile IP registration request message is extended by adding an identifier extension of the mobile IP type thereafter. A specified code may be defined to represent a specific extension type. The length may be set to 1. The data area adopts the identifier to represent the mobile IP type, for example, 0—PMIP, and 1—CMIP. Similarly, more bits may be extended for representing more information.

Figure 7:
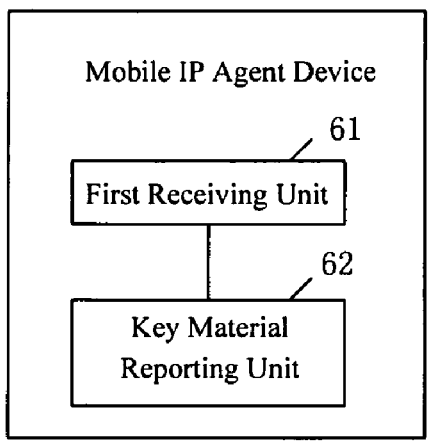
FIG. 7 is a schematic structural view of a mobile IP agent device according a first embodiment of the present invention.

Referring to FIG. 7, which is a schematic structural view of a mobile IP agent device according a first embodiment of the present invention, the mobile IP agent in the embodiment includes a first receiving unit 61 and a key material reporting unit 62. The internal structure and connection relation are further described in combination with working principles.

Firstly, the first receiving unit 61 of the mobile IP agent receives a mobile IP registration request message of a mobile terminal, and in which the mobile IP registration request message includes a key material field, the key material field includes, but not limited to, an HA address field or a mobile IP type field. The mobile IP registration request received by the first receiving unit 61 is a mobile IP registration request protected by using a mobile IP key, and content of the HA address field in the mobile IP registration request is an HA address used when generating the mobile IP key. Further, the key material reporting unit 62 reports material information for determining a key to a key processing entity according to the key material field, and the material information for determining a key includes, but not limited to, the content of the HA address field or an identifier of the content of the HA address field, or the mobile IP type or an identifier of the mobile IP type of the mobile terminal judged according to the HA address field or the mobile IP type field.

Figure 8:
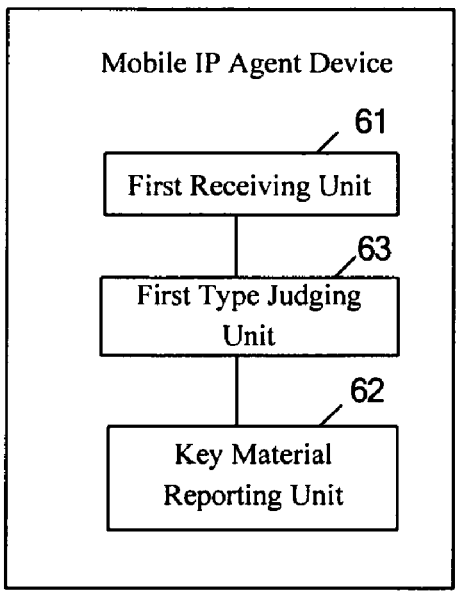
FIG. 8 is a schematic structural view of a mobile IP agent device according a second embodiment of the present invention.

When the material information for determining a key is the mobile IP type or the identifier of the mobile IP type judged according to the HA address field, the mobile IP agent further includes a first type judging unit 63. As shown in FIG. 8, which is a schematic structural view of a mobile IP agent device according to a second embodiment, after the first receiving unit 61 receives the mobile IP registration request including the HA address field, the first type judging unit 63 determines the mobile IP type of the mobile terminal according to the content of the HA address field in the mobile IP registration request message and notifies a judging result to the key material reporting unit 62. Further, the material information for determining a key reported by the key material reporting unit 62 is the mobile IP type or the identifier of the mobile IP type.

In addition, the key processing entity includes, but not limited to, an AAA server and/or a mobile mode storage unit in an access network.

Therefore, the key processing entity may determine the mobile IP key of the mobile terminal according to the received material information for determining a key. Alternatively, if the object to be reported to needs, the mobile IP type of the mobile terminal may also be determined according to the material information for determining a key. After determining the mobile IP key of the mobile terminal, the object to be reported to sends the mobile IP key to the mobile IP agent, namely the first receiving unit 61 of the mobile IP agent receives the mobile IP key of the mobile terminal, and the mobile IP agent may authenticate the mobile IP registration request message of the mobile terminal according to the mobile IP key.

It should be noted that, the determining the mobile IP key of the mobile terminal and the judging the mobile IP type of the mobile terminal according to the information reported by the mobile IP agent are not necessarily related to each other, as described in the above method embodiments. Therefore, the information reported by the key material reporting unit in the mobile IP agent may also be considered as mobile IP type information, and a corresponding field in a corresponding mobile IP registration request message may be considered as a mobile IP type identification field so that the object to be reported to may accordingly determine the mobile IP type of the mobile terminal. A second embodiment of the mobile IP agent is given below.

Figure 9:
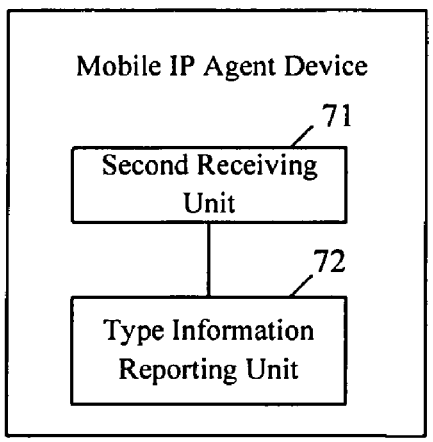
FIG. 9 is a schematic structural view of a mobile IP agent device according a third embodiment of the present invention.

Refer to FIG. 9, which is a schematic structural view of a mobile IP agent device according a third embodiment of the present invention. The mobile IP agent in this embodiment includes a second receiving unit 71 and a type information reporting unit 72. The internal structure and connection relation are further described in combination with the working principles.

Firstly, the second receiving unit 71 of the mobile IP agent receives a mobile IP registration request message of a mobile terminal, and the mobile IP registration request message includes an identification field of a mobile IP type. The identification field of the mobile IP type includes, but not limited to, an HA address field. Further, the type information reporting unit 72 reports mobile IP type information to a mobile IP type demander according to the identification field of the mobile IP type. The mobile IP type information includes, but not limited to, content of an HA address field or an identifier of the content of the HA address field, or the mobile IP type or an identifier of the mobile IP type of the mobile terminal determined according to the HA address field.

Figure 10:
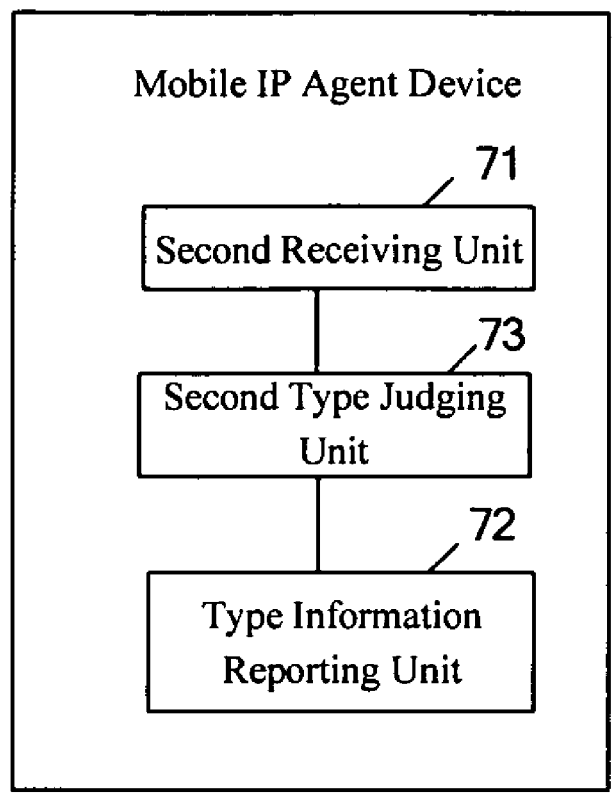
FIG. 10 is a schematic structural view of a mobile IP agent device according a fourth embodiment of the present invention.

When the mobile IP type information is the mobile IP type or the identifier of the mobile IP type judged according to the HA address field, the mobile IP agent further includes a second type judging unit. As shown in FIG. 10, which is a schematic structural view of the mobile IP agent device according to a fourth embodiment, after the second receiving unit 71 receives the mobile IP registration request including the HA address field, the second type judging unit 73 judges the mobile IP type of the mobile terminal according to the content of the HA address field in the mobile IP registration request message and notifies a judging result to the type information reporting unit 72. Further, the mobile IP type information reported by the type information reporting unit 72 is the mobile IP type or the identifier of the mobile IP type.

In addition, the mobile IP type demander includes, but not limited to, an AAA server and/or a mobile mode storage unit in an access network.

The present invention also provides an embodiment of a system for obtaining a mobile IP type of a mobile terminal, which at least includes a mobile IP agent and a mobile IP type demander, in which the mobile IP agent is adapted to receive a mobile IP registration request message of the mobile terminal, and report mobile IP type information of the mobile terminal to the mobile IP type demander according to an identification field of a mobile IP type in the mobile IP registration request message. The mobile IP type demander is adapted to determine the mobile IP type of the mobile terminal according to the mobile IP type information reported by the mobile IP agent.

Figure 11:
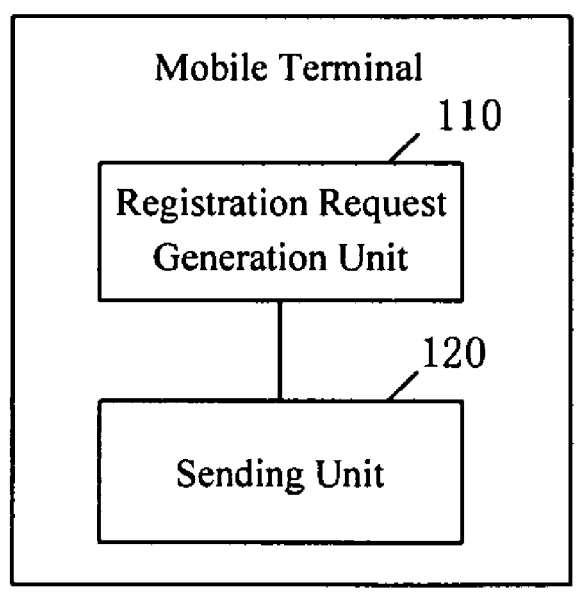
FIG. 11 is a schematic structural view of a mobile terminal according to an embodiment of the present invention.

The present invention also provides an embodiment of a mobile terminal. When the mobile terminal performs an initial access registration or the mobile terminal performs a key update, the mobile terminal sends a mobile IP registration request message to a mobile IP agent for a mobile IP registration, and the mobile IP registration request message includes an identification field of a mobile IP type for identifying a mobile IP type of the mobile terminal. During this process, the key used to protect the mobile IP registration request may be different from the key used to protect a mobile IP registration response message. The initial access registration and the key update both belong to the key update scenario. The two are both needed for the HA. If they are both calculated by the AAA server, after the calculation, the AAA server should send all of the keys to the mobile terminal. S, since the calculation of the key used to protect the mobile IP registration response is the same with that in current mobile IP protocol. Refer to FIG. 11, which is a schematic structural view of a mobile terminal according to an embodiment of the present invention, the mobile terminal in this embodiment includes a registration request generation unit 110 and a sending unit 120, in which the registration request generation unit 110 is adapted to generate a mobile IP registration request message including an identification field of a mobile IP type when the mobile terminal performs an initial access registration or the mobile terminal performs a key update. The identification field of the mobile IP type is adapted to identify a mobile IP type of the mobile terminal. The sending unit 120 is adapted to send the mobile IP registration request message generated by the registration request generation unit 10 to a mobile IP agent.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method for determining a mobile Internet protocol (IP) key for a mobile terminal, comprising:
   receiving, by a mobile IP agent device, a mobile IP registration request message of the mobile terminal, wherein the mobile IP registration request message comprises a home agent (HA) address field;
   judging, by the mobile IP agent device, a mobile IP type of the mobile terminal according to the HA address field, wherein the mobile IP type comprises a proxy mobile IP (PMIP) or a client mobile IP (CMIP); and
   reporting, by the mobile IP agent device, the mobile IP type of the mobile terminal or an identifier of the mobile IP type to an authorization, authentication, and accounting (AAA) server.

2. The method according to claim 1, wherein when the mobile IP registration request is a mobile IP registration request caused by a key update performed by the mobile terminal or caused in the initial mobile IP registration progress, the received mobile IP registration request is a mobile IP registration request protected by using a mobile IP key before the update.

3. The method according to claim 1, further comprising:
   determining, by the AAA server, a mobile IP key of the mobile terminal according to the mobile IP type of the mobile terminal or the identifier of the mobile IP type.

4. A mobile Internet protocol (IP) agent device, comprising:
   a first receiving unit, configured to receive a mobile IP registration request message of a mobile terminal, wherein the mobile IP registration request message comprises a home agent (HA) address field;
   a first type judging unit, configured to judge a mobile IP type of the mobile terminal according to the HA address field, wherein the mobile IP type comprises a proxy mobile IP (PMIP) or a client mobile IP (CMIP); and
   a key material reporting unit, configured to report the mobile IP type of the mobile terminal or an identifier of the mobile IP type to an authorization, authentication, and accounting (AAA) server.

* * * * *